United States Patent Office.

SOLOMON W. KIRK, OF PHILADELPHIA, PENNSYLVANIA, ASSIGNOR TO HIMSELF AND WILLIAM BAILEY, OF SAME PLACE.

Letters Patent No. 109,743, dated November 29, 1870.

IMPROVEMENT IN SEPARATING LEAD FROM THE PRECIOUS METALS.

The Schedule referred to in these Letters Patent and making part of the same.

I, SOLOMON W. KIRK, of the city and county of Philadelphia and State of Pennsylvania, have invented a certain Process for Separating Lead from Precious Metals, of which the following is a specification.

I mix the black oxide of manganese with the melted lead, and force through the mass a stream of oxygen gas or atmospheric air, for the purpose of oxidizing the lead with great rapidity and converting it into litharge, thus separating the precious metals by odiddizing the lead, zinc, &c.

If desired, the oxygen gas or atmospheric air can be forced through the mass without the use of the black oxide of manganese.

I am aware that in the Bessemer process atmospheric air is forced through the molten metal for the purpose of burning out a portion of the carbon; hence I do not wish to broadly claim the process, only when used for separating the baser from the precious metals.

I claim as my invention—

1. The process of applying black oxide of manganese, or any other material that will liberate oxygen at an incandescent heat, to melted lead, and forcing through the mass a stream of oxygen gas or atmospheric air, so as to separate the baser from the precious metals, substantially as described.

2. The process of forcing oxygen gas or atmospheric air through melted lead, so as to convert it with great rapidity into oxide of lead or litharge, for the purpose of separating the gold or silver that it may contain, substantially as specified.

SOLOMON W. KIRK.

Witnesses:
ISAAC R. OAKFORD,
J. M. COLGAN.